May 17, 1932.  P. LANDIS  1,858,365
INTERNAL COMBUSTION ENGINE
Filed Dec. 16, 1929  2 Sheets-Sheet 1
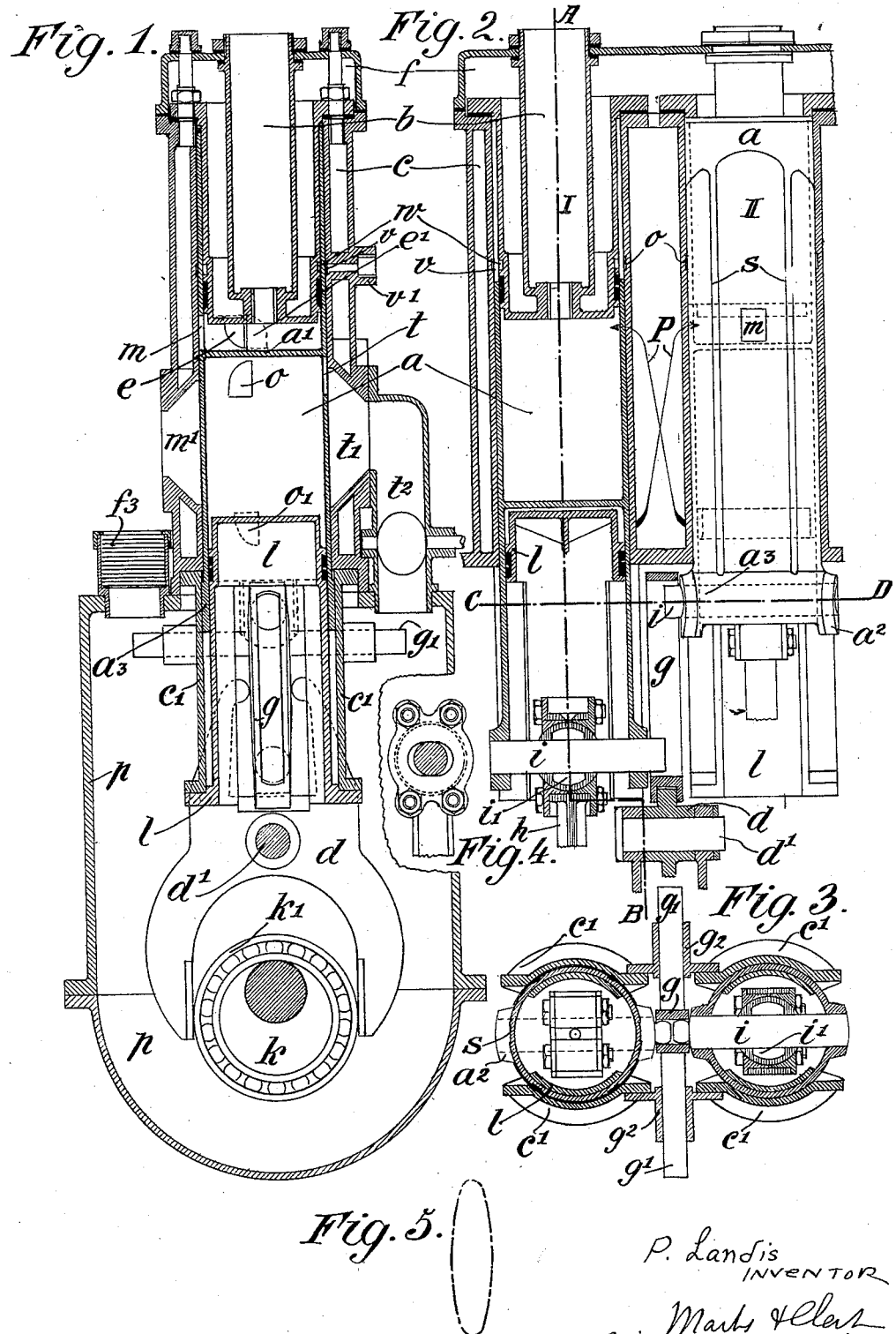

May 17, 1932.  P. LANDIS  1,858,365
INTERNAL COMBUSTION ENGINE
Filed Dec. 16, 1929  2 Sheets-Sheet 2
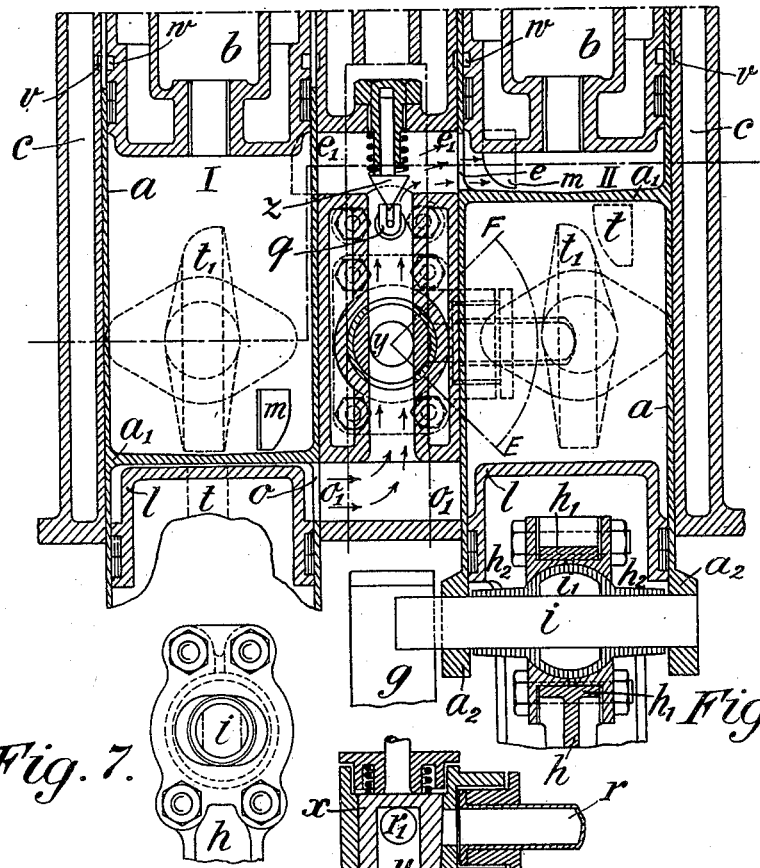
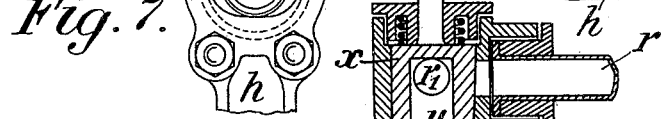
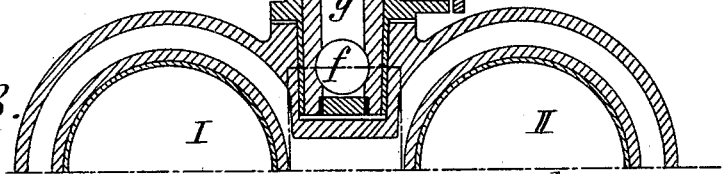
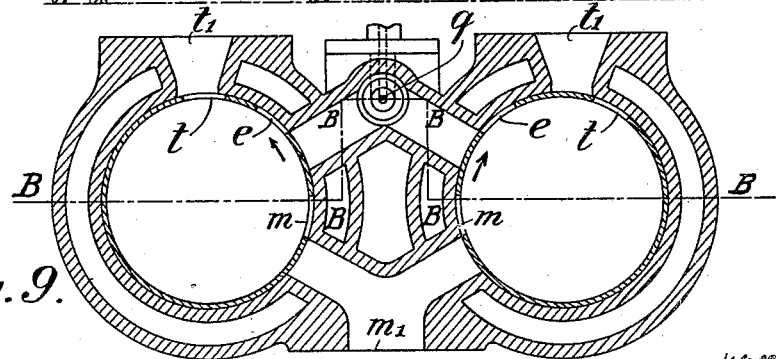

Patented May 17, 1932

1,858,365

UNITED STATES PATENT OFFICE

PAUL LANDIS, OF ZURICH, SWITZERLAND

INTERNAL COMBUSTION ENGINE

Application filed December 16, 1929. Serial No. 414,533.

All additional outputs of internal combustion engines for automobiles, airplanes and airships which have recently been attained are due to the increased speed and to the increase of the compression pressure. The so-called compressor engine also developed therefrom. However, the increase of the compression is limited by the quality of the fuel because in the case of an excess of the compression pressure, spontaneous ignition takes place for gasoline of 5.5 atmospheres and for benzole of 9.3 atmospheres. If, however, the compression pressure of 5 atmospheres could be brought to 12.5 atmospheres, the explosion pressure would increase 80% but with a slight increase of the maximum temperature, the temperature at the end of the expansion would decrease 10%, the output would increase 35% and the specific fuel consumption would decrase 26%. If the two-stroke engine could be used for the building of automobiles, the power output would be doubled with the same dimensions.

These known means are utilized in the present invention. In view of the fact that by the construction according to the present invention two working chambers may be arranged in one cylinder, the lower chamber undertaking the work of compression and the upper chamber the work of explosion, an engine may be produced similar to the two-stroke engine which however does not have the drawbacks of the latter but actually constitutes a double acting four-stroke engine, the power output being doubled. Moreover, the compression pressure could be greatly increased even to explosion pressure in order to be used as a Diesel engine.

The controlling means have also been simplified, no valves, cam shaft and steering wheels are necessary. The tubular shaped steel piston is very light, permits high speeds and is designed as rotary slide valve. It performs by an improved controlling mechanism in addition to the upward and downward movement a lateral oscillating rotary movement whereby the passages are opened and closed. The piston also relieves the cylinder body so that the latter may be made of light metal, the entire weight of the engine being considerably reduced. Owing to the division of the working chambers, the power output may be throttled to 0 while the work of compression is completely performed so that the engine produces considerable braking energy which may be utilized as compressed air.

The drawings show one embodiment of the invention.

Fig. 1 shows a vertical section of the motor on the line A—B of Fig. 2 through one cylinder and omitting the connecting rod and gudgeon pin.

Fig. 2 is a vertical section through both cylinders and in which in the second cylinder the piston is shown in outside elevation.

Fig. 3 is a horizontal section on the line C—D of Fig. 2.

Fig. 4 shows the right hand side of the connecting rod big-end, Fig. 2.

Fig. 5 shows diagrammatically path described by the piston skirt.

Figure 6 shows a vertical section on an enlarged scale of the cylinders I and II on the line B—B of Figure 9.

Figure 7 is a view of the connecting rod head.

Figure 8 shows a section through the cylinders I and II on a level with the rotary cock.

Figure 9 is a section through the inlet, outlet and suction passages.

The engine shown in Figs. 1 to 9 has a piston $a$ which is extended from the piston bottom $a1$ downwards and upwards in tubular form. At the lower end of the piston, gudgeon pin bearings $a2$ are located. These two bearings are connected by means of a reinforcing wall forming sliding surfaces $a3$. This lowest part $a3$ of the piston is guided by two extensions $c1$ fixed to the cylinder body and formed as guide bars, to which extensions a lower cupshaped projection $l$ guiding the piston internally is flanged. The gudgeon pin $i$ is in the example as shown only at one side prolonged and the pins $i$ of the two adjacent pistons are guided by a common guide member $g$ which has two guide pins $g1$ which, at both sides, are supported by bearings $g2$ fixed to the guide segments $g1$ fixed to the cylinder $c1$.

In the upper part of the piston $a$ there is an internal cupshaped projection $b$ which is rendered gas-tight by means of piston rings and is secured to the cylinder body $c$. At its centre, accessible from above, the extension $b$ receives the sparking plug which is accessible from above and is not shown. However, instead of the sparking plug, a fuel injector may be screwed therein.

In the cylinder $c$ appropriate openings (more fully described below) are provided for exhaust, for inlet of compressed air and in the lower part of the cylinder similar openings for the intake of atmospheric air, and for the outlet of compressed air. To these openings correspond openings in the piston $a$. To the opening $m1$ in the cylinder $c$ corresponds the opening $m$ in the piston $a$ both of which serve for exhaust. To the inlet of compressed air, the opening $e1$ in the cylinder $c$ corresponds and the opening $e$ in the piston $a$. Similarly, to the opening $t1$ of the cylinder for the intake of air corresponds the opening $t$ in the piston $a$ and to the opening $o1$ in the cylinder $c$ the opening $o$ in the piston $a$ for the outlet of compressed air.

The gudgeon pin guide member $g$, above mentioned, is oscillated by a swinging lever $d$ pivoted on a pin $d1$ and shown in Fig. 1, the oscillating movement being caused by the rotating motion of an eccentric fixed on the crank shaft and surrounded by a ring on ball bearings $k1$. At the centre of the gudgeon pin $i$ a ball $i1$, drilled through, is secured and is surrounded by two part-spherical shells $h2$ which are screwed in the head $h1$ of the connecting rod $h$ and form a bi-parted ball-joint. Between the flanges thin sheet metal can be inserted which make possible an adjustment of this bearing. In front of the opening $t1$ there is an intake pipe $t2$ which opens into the crank case $p$. The intake of fresh air into the crank case $p$ takes place through the openings $f3$ provided with filters.

There is provided in the cylinder $c$ a pipe $v1$ through which the oil passes under pressure into the passage $v$ which forms an annular recess in the bore of the cylinder. A similar annular recess $w$ is provided opposite in the projection $l$. Between the two adjacent cylinders I and II is a connecting passage $f$ which communicates below with the openings $o$—$o1$ and above with those of $e$—$e1$. There is provided in the passage $f$ a rotary cock $x$ which may be brought into the open position E and into the closed position F. A hole $y$ is bored in the center of the cock $x$ and registers with the hole of the extension $r$ in the position F. The extension $r$ leads to the air container. There is also provided in the passage $f$ a fuel nozzle $q$ which is shut off or closed by a conical valve $z$ subjected to spring pressure.

The method of operation of this motor is as follows:—

On the upward movement of the piston, the passage $m1$—$m$ for exhaust is opened until about 40° before the top dead centre. Somewhat before the end of the exhaust period, 45° before the top dead centre, the passage $e$—$e1$ opens. Compressed air then enters, being forced out from the lower chamber of the corresponding cylinder I through the passages $o$—$o1$. Thus, as shown in Fig. 2, compressed air from the compression chamber of the cylinder I is conducted at the top into the working cylinder II, as is indicated by the arrows P. The opening $o1$—$o$ in the lower chamber becomes open about 45° before the bottom dead-centre so that immediately an overflow takes place $e1$—$e$ being open at the same time. Between the two passages $o$—$o1$ into which the compressed air of both the cylinders I and II is conducted and the passages $e$—$e1$ located, above, from which the compressed air enters by means of the opening $e$ in the piston $a$, there is provided a connecting passage $f$ which conducts the compressed air from $o$—$o1$ through $e1$—$e$ to the cylinder.

The compressed air passing through with great velocity opens the conical valve $z$ in the passage $f$ and receives the requisite fuel. As soon as the air draught ceases, the valve $q$ is closed under the pressure of the spring.

If the engine does not deliver its entire energy, as is the case in the position E of the rotary cock $x$, the latter will be turned toward the position F. If in the position F the passage $f$ is closed above, the compressed air produced in the compression chamber must now pass through the hole $y$ in the cock $x$ and is conducted through the connecting pipe $r$ into the pressure reservoir. There are no explosions in this position F but the compression chambers are working i. e. the engine exerts a great braking effect. This braking energy is stored as generated compressed air in the reservoir and is utilized.

The pressure generated is in proportion to the space between the piston and $a1$ and the projection $b$ in the upper cylinder. This can be increased from the pressure of normally acting four-stroke engines to the pressure used in Diesel engines.

After the charging of explosion chamber has been accomplished and the fuel has been admitted to the compressed air as stated, the ignition follows. The explosion period is the same as in a four-stroke engine, that is, the exhaust opens about 40° before the bottom dead-centre while the opening $m$ registers with the opening $m1$. The lower chamber of the cylinder induces through the opening $t$—$t1$ and through the pipe $t2$ during the upward motion of the piston fresh air from the crank case $h$ which is again filled up with fresh air entering at $f3$. From the up and down movement combined with the lateral rotating movement of the piston $a$ there results an elliptical curve as is shown in Fig. 5, which makes it possible to open and close the passages mentioned. Through the ports $v1$ fresh oil enters under pressure into the channel $v$ in the cylinder. As soon as the edge of the piston comes under this channel the oil flows into the intermediate space above the piston and fills as well the opposed channel $w$ in the extension $b$. The oil which finds itself above the piston cannot escape elsewhere than through the channels $s$ provided in the skirt of the piston and is pressed down into the crank case and is cooled there by fresh air. By the lateral movement of the piston oil from the channels $s$ is distributed over the whole surface of the skirt of the piston so that generous lubrication can be effected.

Since the piston $a$ moves laterally by the controlling means, the connecting rod $h$ must be connected by a ball and socket joint to the gudgeon pin $i$. For this purpose two spherical shells $h2$ are provided in the head $h1$ of the connecting rod and are screwed on both sides to the end faces of the head $h1$ of the connecting rod which surround the ball $i1$ on the gudgeon pin $i$.

What I claim is:—

1. A multi-cylinder internal combustion engine comprising two cylinders, a tubular piston in each cylinder having a bottom substantially in the middle of its length and capable of an oscillatory motion about its axis for the purpose of opening and closing ports in the skirt, a crank case, a crank shaft and two stationary internal projections provided with packing rings extending from below and from above towards the bottom of the piston and into the tubular skirt of the piston, the said projections in conjunction with the bottom of the piston divide the cylinder space into two working chambers of which the lower serves for the generation of compressed air and the upper as an explosive chamber.

2. A multiple cylinder internal combustion engine comprising two cylinders, a tubular piston in each cylinder having a bottom substantially in the middle of its length and capable of an oscillatory motion about its axis for the purpose of opening and closing ports in the skirt, a gudgeon pin of each piston prolonged at least to one side, a movable guide member into which the said prolongation engages, a control member for reciprocating the said guide member and oscillating the piston in addition to its reciprocating movement, a crank case, a crank shaft and two stationary internal projections provided with packing rings extending from below and from above towards the bottom of the piston and into the tubular skirt of the piston, the said projections in conjunction with the bottom of the piston divide the cylinder space into two working chambers of which the lower serves for the generation of compressed air and the upper as an explosive chamber.

3. A multiple cylinder internal combustion engine comprising two cylinders, a tubular piston in each cylinder having a bottom substantially in the middle of its length, a crank case, a crank shaft, two stationary internal projections provided with packing rings, extending from below and from above towards the bottom of the piston and into the tubular skirt of the piston, the said projections in conjunction with the bottom of the piston, divide the cylinder space into two working chambers of which the lower serves for the generation of compressed air and the upper as an explosive chamber, and a stationary guide arrangement for guiding externally the lowest portion of the piston between the gudgeon pin bearings and for receiving the lateral explosion pressure and balancing the remaining part of the piston which internally is guided by the lower projection.

4. A multiple cylinder internal combustion engine comprising two cylinders, a tubular piston in each cylinder having a bottom substantially in the middle of its length and capable of an oscillatory motion about its axis for the purpose of opening and closing ports in the skirt, the piston skirt being provided with oil ways extending from above to beneath, through which the oil entering at the bottom dead-centre position is forced downwards to lubricate the whole skirt area, a crank case, a crank shaft and two stationary internal projections provided with packing rings extending from below and from above towards the bottom of the piston and into the tubular skirt of the piston, the said projections in conjunction with the bottom of the piston divide the cylinder space into two working chambers of which the lower serves for the generation of compressed air and the upper as an explosive chamber.

5. A multiple cylinder internal combustion engine comprising two cylinders, a tubular piston in each cylinder having a bottom substantially in the middle of its length and capable of an oscillatory motion about its axis for the purpose of opening and closing ports in the skirt, a connecting rod attached to the gudgeon pin by a bi-parted ball joint and being adjustable, a crank case, a crank shaft and two stationary internal projections provided with packing rings extending from below and from above towards the bottom of the piston and into the tubular skirt of the piston, the said projections in conjunction with the bottom of the piston, divide the cylinder space into two working chambers of which the lower serves for the generation of compressed air and the upper as an explosive chamber.

6. A multiple cylinder combustion engine comprising two cylinders, a tubular piston in each cylinder having a bottom substantially in the middle of its length and capable of an oscillatory motion about its axis for the purpose of opening and closing ports in the skirt, a crank case, a crank shaft, a gudgeon pin of each piston prolonged at least to one side, a movable guide member having a longitudinal slot into which the said prolongation engages, a pivoted lever to operate the said guide member, an eccentric fixed to the crankshaft and engaging the said lever for the purpose of rotating the piston, and two stationary internal projections provided with packing rings extending from below and from above towards the bottom of the piston and into the tubular skirt of the piston, the said projections in conjunction with the bottom of the piston divide the cylinder space into two working chambers of which the lower serves for the generation of compressed air and the upper as an explosive chamber.

7. A multiple cylinder combustion engine comprising two cylinders, a tubular piston in each cylinder having a bottom substantially in the middle of its length and capable of an oscillatory motion about its axis for the purpose of opening and closing ports in the skirt, a crank case, a crank shaft, the piston skirt being provided with ports capable of being put into connection with the outside air across the crank case without a valve, to induce air into this case and two stationary internal projections provided with packing rings extending from below and from above towards the bottom of the piston and into the tubular skirt of the piston, the said projections in conjunction with the bottom of the piston divide the cylinder space into two working chambers of which the lower serves for the generation of compressed air and the upper as an explosive chamber.

In testimony whereof I have affixed my signature.

PAUL LANDIS.